United States Patent [19]

Roberts

[11] Patent Number: 4,708,177

[45] Date of Patent: Nov. 24, 1987

[54] FUME EXTRACTOR DEVICE

[75] Inventor: David L. Roberts, Telford, England

[73] Assignee: Shell Internationale Research Maatschappij, B.V., Netherlands

[21] Appl. No.: 746,686

[22] Filed: Jun. 20, 1985

[30] Foreign Application Priority Data

Jul. 12, 1984 [GB] United Kingdom ................. 8417780

[51] Int. Cl.[4] ......................... A47L 9/02; B65G 67/06; B65B 1/28

[52] U.S. Cl. ....................................... 141/93; 141/392; 141/98; 141/65; 15/415 R; 98/115.1

[58] Field of Search ....................... 141/93, 85, 44, 65, 141/98, 392, 285, 286; 15/415 R; 98/5, 6, 1, 52, 115.1

[56] References Cited

U.S. PATENT DOCUMENTS

| | | | |
|---|---|---|---|
| 2,105,589 | 1/1938 | Eades | 141/93 |
| 2,874,733 | 2/1959 | Sesler et al. | 141/87 |
| 3,096,704 | 9/1963 | Russel | 141/93 X |
| 3,127,462 | 3/1964 | Erni et al. | 98/115.1 X |
| 3,149,649 | 9/1964 | Hix | 141/93 |
| 3,867,969 | 2/1975 | Garnett | 141/93 X |
| 4,131,141 | 12/1978 | Weissenbach | 141/285 |
| 4,182,591 | 1/1980 | Stanelle | 141/93 X |
| 4,184,226 | 1/1980 | Loevenich | 15/415 R |
| 4,185,669 | 1/1980 | Jevakohoff | 141/59 |
| 4,296,523 | 10/1981 | Clark | 15/415 R |
| 4,312,388 | 1/1982 | Hager et al. | 141/1 |

FOREIGN PATENT DOCUMENTS

| | | | |
|---|---|---|---|
| 492560 | 7/1919 | France | 141/93 |
| 230249 | 3/1925 | United Kingdom . | |
| 2055657 | 3/1981 | United Kingdom | 98/115.1 |

OTHER PUBLICATIONS

Heating and Ventilating's Detail Sheet, pp. 9 & 10, Jul., 1953.

*Primary Examiner*—Henry J. Recla
*Assistant Examiner*—Ernest G. Cusick
*Attorney, Agent, or Firm*—Jones, Tullar & Cooper

[57] ABSTRACT

The invention provides a fume extractor device for attachment adjacent a filling orifice of a container, which device comprises a hollow collar having inner and outer walls connected to one another, an outlet in the outer wall which is connectable to a fume removal system, and at least one opening in the inner wall, and connecting structure for releasably connecting the hollow collar to a container with the inner wall disposed around the filling orifice thereof. The connecting structure together with the hollow, collar comprise a clamping structure to releasably engage the cylindrical side wall of the container. In the operation of the device, the container may be filled or emptied by means of a dip tube inserted into the container through the hollow collar and the filling orifice and vapors escaping from the container through the orifice are extracted through the at least one opening in the inner wall and out of the hollow collar through the outlet by the fume removal system.

3 Claims, 2 Drawing Figures

FUME EXTRACTOR DEVICE

BACKGROUND OF THE INVENTION

This invention relates to a fume extractor device for attachment adjacent a filling orifice of a container.

Many chemicals are supplied in cylindrical drums, typically of about 200 liters capacity, which are closed by a stopper screwed into an orifice at one end. To withdraw contents from the drum it is normal practice to stand the drum on end with the orifice at the top, remove the stopper, insert a dip tube and pump out the contents. Unfortunately during this process vapors from the chemical in the drum escape into the atmosphere when the stopper is first removed and later from the annular space around the dip tube. These vapors can constitute an environmental hazard if they are inflammable, toxic, corrosive or have an unpleasant smell. It is customary to attempt to minimize this hazard by placing the open end of a large diameter flexible pipe which is attached to a fume removal system close to the orifice, but this practice does not entirely prevent the escape of inflammable, toxic, corrosive or unpleasant vapors into the surrounding atmosphere. Evaporation of liquid adhering to the surface of the dip pipe upon removal from the drum may create further such hazard.

Steam removal is frequently employed to extract final traces of drum contents, but such removal frequently has the disadvantages that the normal large-diameter conduit of a steam extraction system cannot be precisely located and is unable fully to cope with the steam and vapor from the drum.

Similar problems can be experienced when filling such drums due to air forced out of the drum containing chemical vapor.

SUMMARY OF THE INVENTION

According to the present invention there is provided a fume extractor device for attachment adjacent a filling orifice of a container, which device comprises a hollow collar having inner and outer walls connected to one another, an outlet in the outer wall which is connectable to a fume removal system, and at least one opening in the inner wall, and connecting means for releasably connecting the hollow collar to a container with the inner wall disposed around the filling orifice thereof, whereby in operation of the device, the container may be filled or emptied by means of a dip tube inserted into the container through the hollow collar and the filling orifice and vapors escaping from the container through the orifice are extracted through the at least one opening in the inner wall and out of the hollow collar through the outlet by the fume removal system.

The container may be of any shape, for example rectangular or cylindrical (drum-shaped) and the filling orifice may also be of any shape. Filling orifices are, however, most commonly and conveniently circular. For use with a container having a circular filling orifice, it is preferred for the hollow collar to be annular.

The at least one opening in the inner wall of the hollow collar may advantageously comprise a mesh grid or a plurality of openings (e.g. holes or slits) evenly spaced around the inner wall. However a particularly advantageous arrangement is one in which the at least one opening comprises a circular slit extending around the inner wall of an annular hollow collar.

The connecting means may comprise any known means e.g. suction pads, straps or clamps. When the device is to be used with a drum-shaped container, the connecting means together with the hollow collar preferably comprises clamping means to releasably engage the cylindrical side wall of the drum-shaped container. Such clamping means may engage with the cylindrical side wall at for example two, three or four points around the drum.

In a preferred embodiment of the invention, however, the connecting means together with the hollow collar is arranged to extend across a diameter of an end of a drum-shaped container.

It is not necessary for the hollow collar to connect in a gas-tight manner with the container, but it has been found generally convenient to provide the hollow collar with a resilient seal to engage with the container around the orifice. Such a seal should be made of a material which is substantially unaffected by the vapors which the device is intended to extract.

BRIEF DESCRIPTION OF THE DRAWING

The invention will be further understood from the following detailed description of a preferred embodiment thereof, which is made by way of example only and with reference to the accompanying drawings, in which.

DETAILED DESCRIPTION OF A PREFERRED EMBODIMENT

Figure 1:
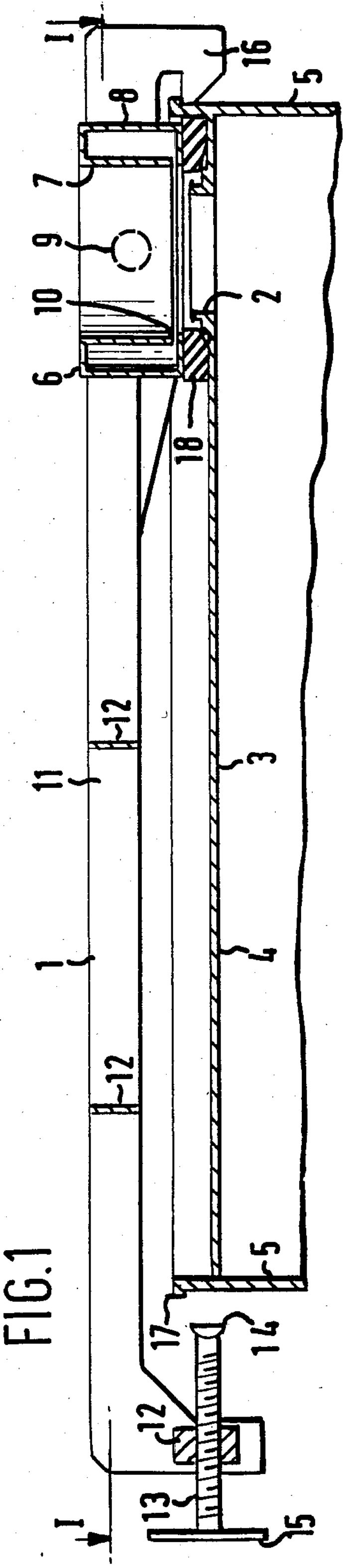
FIG. 1 is a cross-section through a fume extractor device and the top end of a drum-shaped container to which the device is to be attached.
Figure 2:
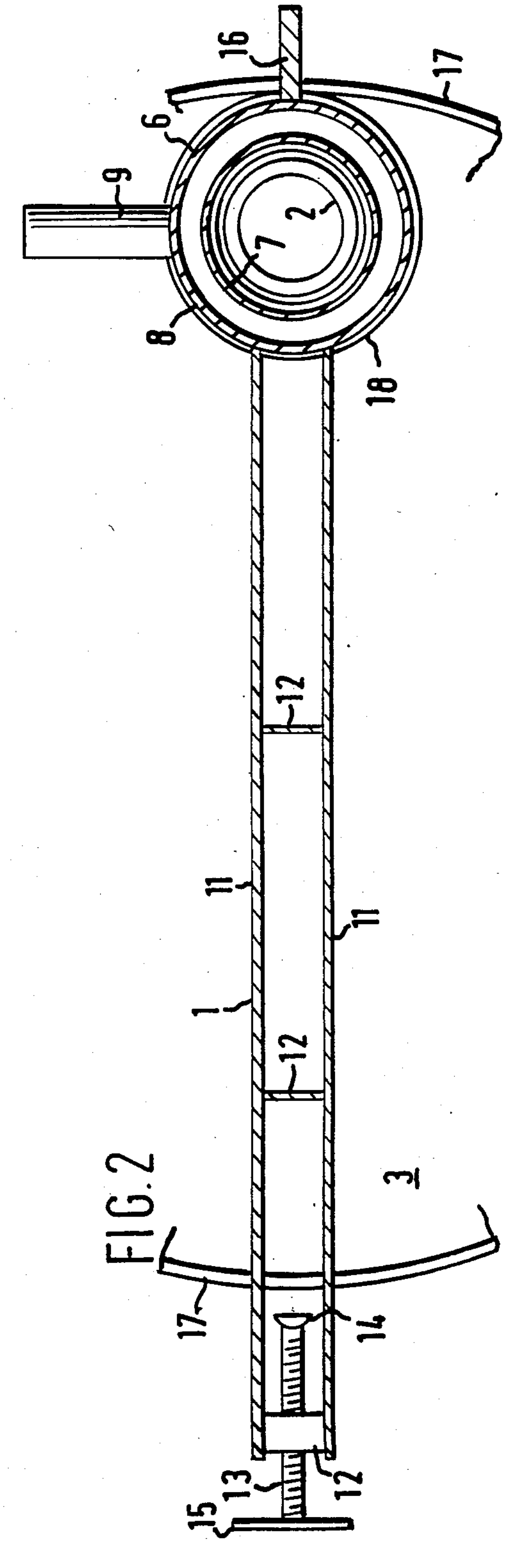
FIG. 2 is a cross-section through the device of FIG. 1 along the line I—I.

Referring to FIG. 1, there is shown a fume extractor device 1 for attachment adjacent a circular filling orifice 2 of a drum-shaped container 3 having a circular top end 4 and a cylindrical side-wall 5. As shown in FIGS. 1 and 2, the device 1 comprises an annular hollow collar 6 having cylindrical inner and outer walls 7 and 8 connected to one another, an outlet 9 in the outer wall 8 which is connectable to a fume removal system (not shown) and which for that purpose as shown is a pipe which is a simple push fit with a hose connection, but which may alternatively have a screw thread or bayonet fitting at its outer end, and an opening 10 in the inner wall 7 in the form of a circular slit extending around the inner wall 7.

The device 1 includes connecting means for releasably connecting the collar 6 to the container 3 with the inner wall 7 disposed around the orifice 2. The connecting means together with the collar 6 comprises clamping means to releasably engage the cylindrical side-wall 5 of the container 3.

The connecting means comprises a pair of longitudinal members 11 attached at one end to the outer wall 8, interconnected along their length by web pieces 12 and provided at the other end with a screw fitting 13 having a freely rotatable end pad 14 to abut the side-wall 5 and a hand-wheel 15 for ease of fitting; and a fixed hook-shaped member 16 attached on the opposite side of the outer wall 8 from the members 11.

In use, the longitudinal members 11 and the collar 6 extend across the diameter of the circular top end 4 of the container 3, and the end pad 14 and hook-shaped member 16 engage the cylindrical side-wall 5 of the container 3 beneath a flanged lip 17 at the rim of the container 3. The collar 6 is provided with a resilient seal 18, which engages with the container 3 around the orifice 2.

In operation, the device 1 is attached to the container 3 as described above, and a fume removal system, which may conveniently be an extraction fan or a fluid ejector, for example a steam ejector, is attached to the outlet 9 and draws air from around the orifice 2 through the opening 10. Until this stage, the orifice 2 has been closed by a drum stopper. The stopper is now removed with a conventional type of drum key and a dip tube is inserted into the container 3 through the collar 6 and the orifice 2. Vapors escaping from the container 3 through the orifice 2 are extracted through the opening 10 in the inner wall 7 and out of the hollow collar 6 through the outlet 9 by the fume removal system. Loss of vapor to the atmosphere is thus avoided both during insertion of the dip tube and while the container 3 is being filled or emptied through the dip tube.

After the container 3 has been emptied, slow removal of the dip tube will enable cleaning of the dip tube of volatile matter by air streaming past the tube and into the opening 10.

The empty container 3 may be steam-cleaned, when it is safe to do so, by passing steam through the dip tube. Steam and vapors emerging from the container 3 during steam-cleaning are extracted through the opening 10 as described above.

By way of non-limiting example, in the case where the container 3 is a British standard 45 gallon (0.205 $m^3$) drum, the maximum distance between the end pad 14 and the hook-shaped member 16 will typically be about 70 cm, the diameter of the cylindrical inner wall 7 of the hollow collar 6 will typically be about 8.25 cm to about 11.5 cm and the area of the circular slit opening 10 will be about 400 $mm^2$. A conventional fume extraction fan giving a negative pressure of 500 to 750 Pa and flow rate of 400 to 500 liters per minute will result in a linear velocity through the circular slit opening 10 greater than 1500 cm/second, which has been found to give very good results.

As illustrated, with the exception of the resilient seal 18, which is made of a styrene-butadiene rubber (but may be made of other elastomeric materials, as will be appreciated by those skilled in the art), the device 1 is a welded mild steel construction. The device may however be made of other metals, or, depending on the vapors to be dealt with, of a suitable plastics material such as polypropylene. Thus, for example, the device may comprise a polypropylene hollow collar provided with clamping means of mild steel.

Although, as described above, the fume extractor device is described in relation to extraction of vapor from liquids, the device may also be used for dust extraction when containers are filled with fine powders in the same manner as liquids. In these circumstances, the terms "fume" and "vapors" are to be construed as including gas- or air-borne dusts.

What is claimed is:

1. A fume extractor device for attachment adjacent a filling orifice of a drum-shaped container, which device comprises an annular hollow collar having inner and outer walls connected to one another, an outlet in the outer wall which is connectable to a fume removal system, and at least one opening in the inner wall, a resilient seal to engage with the container around the filing orifice, and means for releasably clamping the hollow collar and resilient seal to the drum-shaped container with the inner wall disposed around the filling orifice, whereby in the operation of the device, the drum-shaped container may be filled or emptied by means of a dip tube inserted into the container through the hollow collar and the filling orifice and vapors escaping from the container through the orifice are extracted through the at least one opening in the inner wall and out of the hollow collar through the outlet by the fume removal system.

2. A device according to claim 1 wherein the at least one opening comprises a circular slit extending around the inner wall of the annular hollow collar.

3. A device according to claim 1 wherein the means for releasably clamping together with the hollow collar is arranged to extend across the diameter of an end of the drum-shaped container.

* * * * *

UNITED STATES PATENT AND TRADEMARK OFFICE

CERTIFICATE OF CORRECTION

PATENT NO. : 4,708,177

DATED : November 24,1987

INVENTOR(S) : David L. Roberts

It is certified that error appears in the above-identified patent and that said Letters Patent is hereby corrected as shown below:

Column 4, line 24, "filing" should be -filling--.

Signed and Sealed this

Seventeenth Day of May, 1988

*Attest:*

DONALD J. QUIGG

*Attesting Officer*

*Commissioner of Patents and Trademarks*